(12) United States Patent
Valles et al.

(10) Patent No.: US 10,140,449 B2
(45) Date of Patent: *Nov. 27, 2018

(54) CLUSTER ANOMALY DETECTION USING FUNCTION INTERPOSITION

(71) Applicant: Intel Corporation, Santa Clara, CA (US)

(72) Inventors: Antonio C. Valles, Gilbert, AZ (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/685,857

(22) Filed: Aug. 24, 2017

(65) Prior Publication Data

US 2018/0101680 A1    Apr. 12, 2018

Related U.S. Application Data

(63) Continuation of application No. 14/497,523, filed on Sep. 26, 2014, now Pat. No. 9,773,110.

(51) Int. Cl.
*G06F 21/55* (2013.01)

(52) U.S. Cl.
CPC .... *G06F 21/554* (2013.01); *G06F 2221/2101* (2013.01)

(58) Field of Classification Search
CPC ............. G06F 21/554; H04L 63/1416; H04L 63/1408

USPC ........................................................ 726/23
See application file for complete search history.

(56) References Cited

U.S. PATENT DOCUMENTS

| | | | |
|---|---|---|---|
| 8,239,947 B1* | 8/2012 | Glick | G06F 21/52 713/1 |
| 9,158,604 B1 | 10/2015 | Christodorescu et al. | |
| 9,773,110 B2 | 9/2017 | Valles et al. | |
| 2010/0125909 A1 | 5/2010 | Dai et al. | |
| 2011/0078794 A1 | 3/2011 | Manni et al. | |
| 2011/0289586 A1* | 11/2011 | Kc | G06F 21/566 726/24 |
| 2014/0123280 A1* | 5/2014 | Kedma | G06F 21/56 726/23 |
| 2014/0380474 A1* | 12/2014 | Paithane | G06F 21/566 726/23 |
| 2016/0232352 A1 | 8/2016 | Chen et al. | |
| 2016/0261465 A1 | 9/2016 | Gupta et al. | |

OTHER PUBLICATIONS

Intel, "Intel Expressway API Manager", 2012, 4 pages.
(Continued)

*Primary Examiner* — Teshome Hailu
(74) *Attorney, Agent, or Firm* — Jordan IP Law, LLC

(57) ABSTRACT

Systems and methods may provide for identifying a runtime behavioral pattern of an application and detecting an anomaly in the runtime behavioral pattern. In addition, a security event may be triggered in response to the anomaly. In one example, the anomaly is detected with regard to one or more of a library call count, a library call type, a library call argument configuration or a library call timing associated with a runtime operation of the application.

28 Claims, 5 Drawing Sheets

(56) References Cited

OTHER PUBLICATIONS

Vivek Gupta, "Intel: Moving Ahead With the Right Strategy", Dec. 24, 2013, 1 page.
McAfee, "The Security Industry's Dirty Little Secret", The debate over advanced evasion techniques (AETs), 2012, 8 pages.
Meyer et al., "Best Practices for HPC Procurement and Infrastructure", Seventh Framework Programme Research Infrastructures, PRACE-2IP-RI-283493, INFRA-2011-2.3.5, Aug. 23, 2013, 10 pages.
Timothy Prickett Morgan, "ARM daddy simulates human brain with million-chip super The Register", Jul. 7, 2011, 7 pages.
Stephen Shankland, "Nvidia's graphics brawn powers supercomputing brains", CNET, Jun. 18, 2013, 6 pages.
Non-Final Office Action for U.S. Appl. No. 14/497,523, dated Dec. 21, 2015, 12 pages.
Final Office Action for U.S. Appl. No. 14/497,523, dated Jun. 30, 2016, 15 pages.
Non-Final Office Action for U.S. Appl. No. 14/497,523, dated Dec. 1, 2016, 10 pages.
Notice of Allowance for U.S. Appl. No. 14,497,523, dated May 25, 2017, 5 pages.
Brent Sammons, "Snapdragon Smart Protect detects more mobile malware", qualcomm.com/news/ onq/2015/08/31/snapdragon-820-countdown-snapdragon-smart-protect-detects-more-mobile, Aug. 31, 2015, 6 pages.
Christian De Looper, "Upcoming Qualcomm Processors to Have On-Board Security Features", techtimes.com/articles/80811/20150903/upcoming-qualcomm-processors-board-security-features.htm, Sep. 3, 2015, 2 pages.
Koh Wanzi, "Qualcomm Snapdragon 820—Return of the SoC king", HardwareZone.com.sg/feature-qualcomm-snapdragon-820-return-soc-king/zeroth-device-cognitive-computing, Mar. 25, 2016, 5 pages.
Yoon et al., "Learning Execution Contexts from System Call Distribution for Anomaly Detection in Smart Embedded System", IoTDI, Apr. 2017, 6 pages.

\* cited by examiner

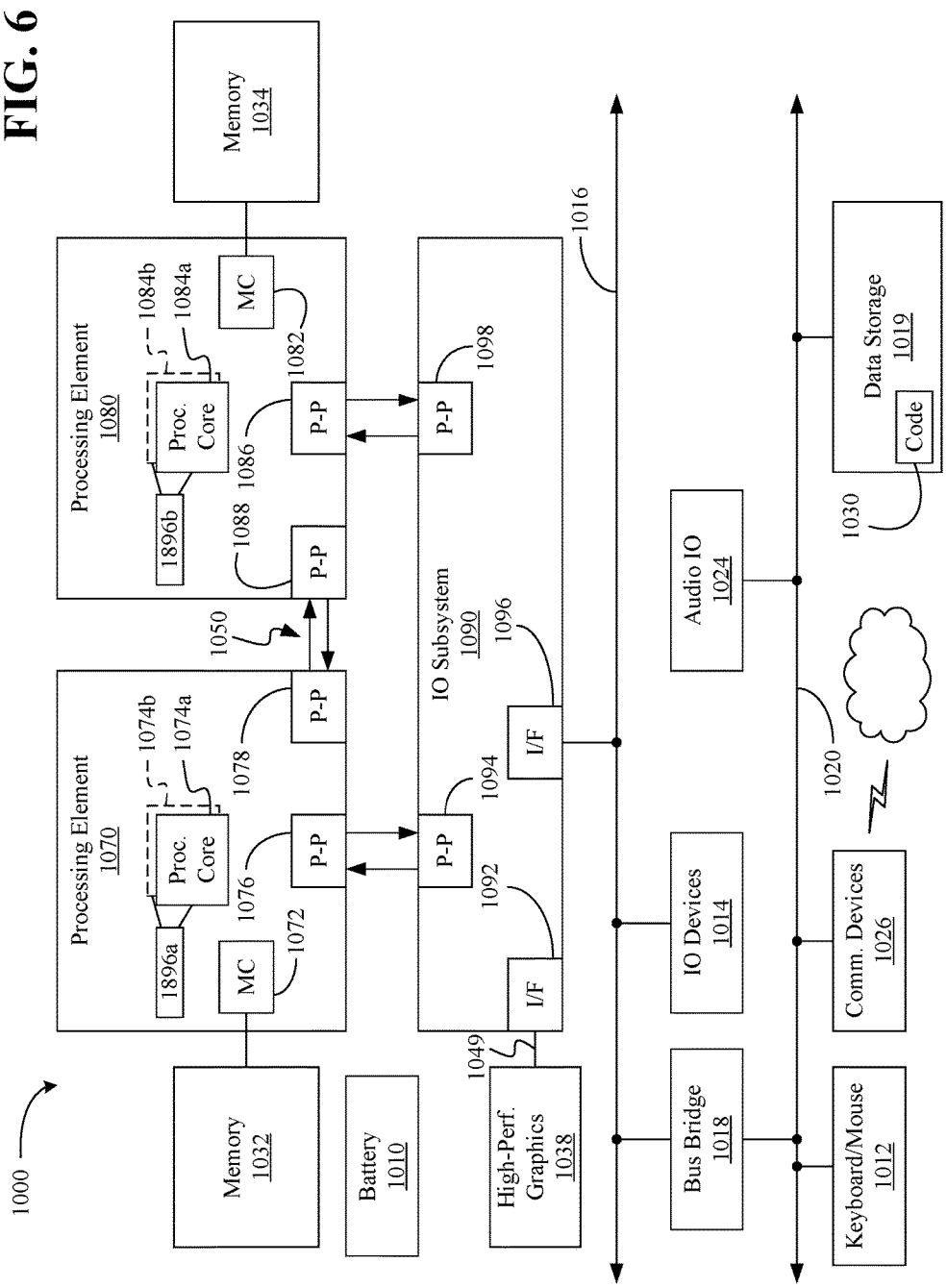

CLUSTER ANOMALY DETECTION USING FUNCTION INTERPOSITION

CROSS REFERENCE TO RELATED APPLICATIONS

This application is a continuation of U.S. patent application Ser. No. 14/497,523 filed Sep. 26, 2014.

TECHNICAL FIELD

Embodiments generally relate to computing security. More particularly, embodiments relate to using function interposition to detect anomalies in computing cluster environments.

BACKGROUND

Computing environments such as governmental labs may use software applications running on high performance computing (HPC) clusters to conduct sensitive operations such as, for example, nuclear device simulations, aerospace operations, and so forth. These operations, as well as the data used by and resulting from the operations, may be considered critical from a security standpoint. Current state of the art security solutions may involve monitoring operating system components (e.g., host-based intrusion detection system/HIDS) and/or network traffic (e.g., network-based intrusion detection system/NIDS) for security breaches. These solutions may be susceptible, however, to the dynamic insertion of malicious code between an application and the dynamic libraries called by the application. For example, a potential type of intrusion might intercept API (Application Programming Interface) calls to a given library without the application, library, host, network or user being aware of the interception.

BRIEF DESCRIPTION OF THE DRAWINGS

The various advantages of the embodiments will become apparent to one skilled in the art by reading the following specification and appended claims, and by referencing the following drawings, in which:

FIG. 6 is a block diagram of an example of a system according to an embodiment.

DESCRIPTION OF EMBODIMENTS

Figure 1:
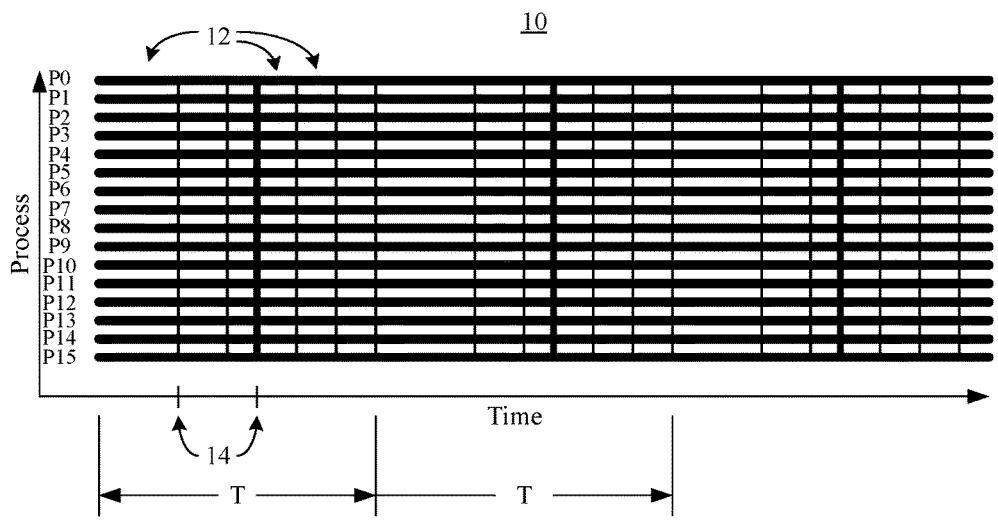
FIG. 1 is an illustration of an example of a Message Passing Interface (MPI) profile that shows a runtime behavioral pattern of an application according to an embodiment.

Turning now to FIG. 1, a Message Passing Interface (MPI) profile 10 is shown for an application having multiple processes (also known as ranks) (e.g., "P0" to "P15") that operate in parallel to perform tasks in, for example, a high performance computing (HPC) environment. In general, the application may perform sensitive tasks such as nuclear device simulations, aerospace operations, banking and/or electronic commerce (e-commerce) transactions, and so forth. In the illustrated example, during time periods 12 (illustrated as horizontal sections) the processes conduct computations that may involve making various dynamic library calls (e.g., application programming interface/API calls such as threading or memory allocation/deallocation). During time periods 14 (illustrated as vertical lines), the illustrated processes pass messages to one another via, for example, MPI API calls. As will be discussed in greater detail, function interposition may be used to capture data regarding the library calls (MPI calls, threading calls, memory allocation/deallocation, etc.) made by the application processes, wherein the captured data may in turn be used to identify one or more phases in the application runtime. Moreover, the phases of the application may represent a runtime behavioral pattern that may be used to automatically detect security breaches.

For example, a time period "T" may contain activity such as, for example, six sets of MPI call activity interspersed with computation periods, wherein each set has a certain type and number of MPI calls and that activity may repeat. Accordingly, the time period T might be identified as a phase that represents a runtime behavioral pattern. Anomalies in the phases of the runtime behavioral pattern may be indicative of malicious code having been inserted between the application and the dynamic libraries called by the application. Thus, for example, if a given phase unexpectedly takes longer than expected or contains more MPI calls than usual (or different types of calls, arguments, timing, etc.), such an anomaly may be used to trigger a security event such as, for example, an alert, log entry, application shut-down, and so forth.

Figure 2:
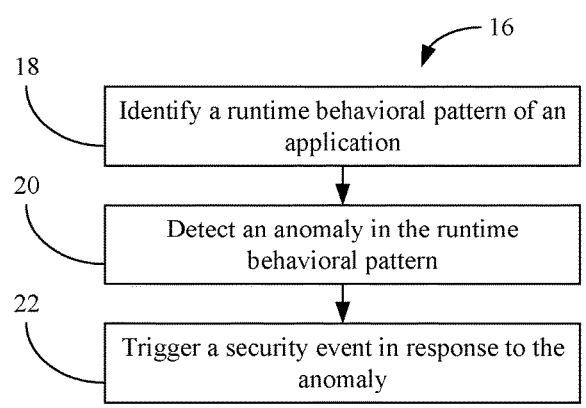
FIG. 2 is a flowchart of an example of a method of securing a computing environment according to an embodiment.

FIG. 2 shows a method 16 of securing a computing environment. The method 16 may be implemented as one or more modules in a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof. For example, computer program code to carry out operations shown in method 16 may be written in any combination of one or more programming languages, including an object oriented programming language such as C#, Ruby, Perl, Python, JAVA, C/C++, Fortran or the like.

Illustrated processing block 18 provides for identifying a runtime behavioral pattern of an application. In one example, block 18 identifies one or more phases in the runtime behavioral pattern based on source markers (e.g., added to the source code), historical data (e.g., monitored over time), a search heuristic (e.g., particular conditions likely to be indicative of the existence of a phase), and so forth. Block 20 may detect an anomaly in the runtime behavioral pattern. The anomaly detection at block 20 may be conducted between phases in order to reduce the intrusiveness of the method 16. As will be discussed in greater detail, the anomaly may be detected with regard to a library call count, a library call type, a library call argument configuration, a library call timing (e.g., having a delay, duration and/or temporal spacing attribute), etc., or any combination thereof. Moreover, control phase data and current phase data may be obtained from the application, wherein detecting the anomaly includes comparing the current phase data to the control phase data.

In one example, the control phase data and the current phase data are obtained via function interposition. For example, the phase data collectors may be statically linked, dynamically linked and/or pre-loaded into the application at startup, wherein the phase data collectors may be configured to capture runtime information such as, for example, the number and type of library calls within the phase, arguments of library calls (including message sizes), delay/length of library calls, time between library calls, and so forth. The C++ code snippet below shows one example of an intercepted library call.

---

```
...
Void mpi_isend_(...)
{
//get data structures from thread local storage (TLS)
API_cnt *ac = getAPICount_TLS( );
vector<Call_data> *v = getCallData_TLS( );
//increment API count
ac->MPI_ISEND++;
//store call data at start of call
v->push_back(Call_data(MPI_ISEND, START, ac->getThreadID( )));
vector<Call_data>::iterator x = (v->end( ) – 1);
x->set_hit_count(ac->MPI_ISEND); //API_Count
x->add_art(*count); //store relevant args (showing one here)
...
  //call real function
  R_MPI_ISEND(...);
//store call data at end of call
v->push_back(Call_data(MPI_ISEND, END, ac->getThreadID( )));
x = (V->end( ) – 1);
x->set_hit_count(ac->MPI_ISEND); //API_Count
x->add_arg(*count); //store relevant arguments
...
}
...
```

---

Since the API calls may be numbered per software thread and per rank/process, the current phase data may be compared to the control phase data on an overall average basis, a per call basis, a per software thread basis, a per process basis, etc., or any combination thereof. Thus, if the comparison indicates a difference between the control phase data and the current phase data, illustrated block 22 triggers a security event such as, for example, an alert, log entry, application shut-down, and so forth.

Figure 3:
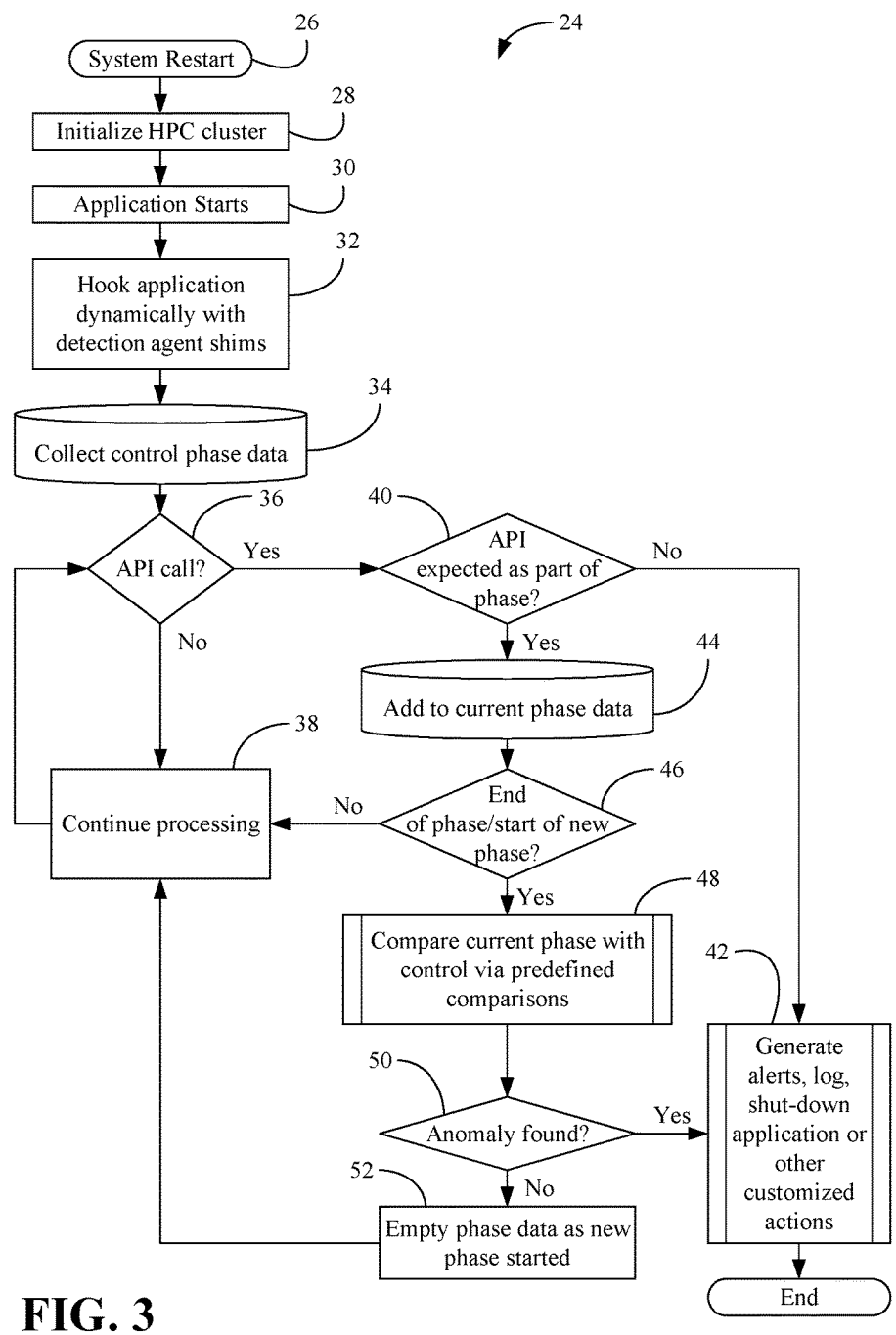
FIG. 3 is a flowchart of an example of a method of using control phase data and current phase data to secure a computing environment according to an embodiment.

Turning now to FIG. 3, a more detailed method 24 of securing a computing environment is shown in which control phase data and current phase data are used. The method 24 may also be implemented as one or more modules in a set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Upon a system restart at block 26, a computing environment such as, for example, an HPC cluster may be initialized at block 28. A particular application may start at block 30, wherein the application may be a multi-process application that involves the handling of sensitive information. Block 30 may include ensuring that an authorized agent started the application. The application may be dynamically "hooked" at block 32 with detection agent shims (e.g., phase data collectors). As already noted, the phases of a runtime behavioral pattern may be identified based on source markers, historical data, search heuristics, etc., or any combination thereof. Moreover, block 32 may automatically configure the phase data collectors with an indication of the library calls to interpose as well as the type of data to be collected (e.g., library call count, type, argument configuration, timing, etc.).

Control phase data may be collected from the application and stored at block 34, wherein a determination may be made at block 36 as to whether a library call (e.g., API call) has been made during a current phase. If not, illustrated block 38 continues processing. If a library call has been made, block 40 may determine whether the library call was expected (e.g., the expected type of call). If not, illustrated block 42 may immediately trigger a security event by, for example, generating an alert, making a log entry, shutting down the application or taking some other customized action. If the library call was expected, phase data associated with the call may be added to the current phase data at block 44.

A determination may be made at block 46 as to whether the end of the current phase or the start of a new phase has been encountered. If so, illustrated block 48 compares the current phase data with the control phase data based on predefined comparison attributes such as, for example, library call count, type, argument configuration, timing, etc., associated with the runtime operation of the application. As already noted, performing the anomaly detection between phases may minimize the intrusiveness of the illustrated method 24. If an anomaly is detected at block 50, a security event may be triggered at block 42, as already discussed. Otherwise, illustrated block 52 empties the current phase data and begins replacing it with new current phase data.

Figure 4:
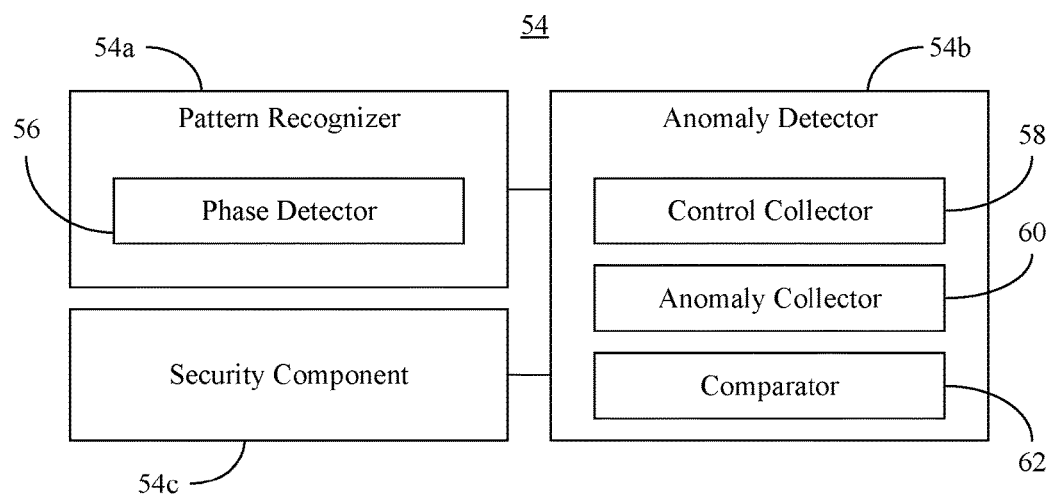
FIG. 4 is a block diagram of an example of a logic architecture according to an embodiment.

FIG. 4 shows a logic architecture 54 (54a-54c) that may be used to secure a computing environment. The logic architecture 54 may generally be fixed-functionality hardware logic, configurable logic and/or logic instructions that implement one or more aspects of the method 16 (FIG. 2) and/or the method 24 (FIG. 3), already discussed. In the illustrated example, a pattern recognizer 54a identifies a runtime behavioral pattern of an application. The pattern recognizer 54a may include a phase detector 56 to identify one or more phases in the runtime behavioral pattern based on source markers, historical data, search heuristics, etc., or any combination thereof.

The illustrated logic architecture 54 also includes an anomaly detector 54b coupled to the pattern recognizer 54a, wherein the anomaly detector 54b may generally detect one or more anomalies in the runtime behavioral pattern. More particularly, the anomaly detector 54b may include a control collector 58 to obtain control phase data from the application, an anomaly collector 60 to obtain current phase data from the application, and a comparator 62 to compare the current phase data to the control phase data in order to detect the one or more anomalies. As already noted, the control phase data and the current phase data may be obtained via function interposition. Thus, the control collector 58 and the anomaly collector 60 might be implemented as, for example, preloaded functions that are interposed between the application and the libraries called by the application. Moreover, the current phase data may be compared to the control phase data on an overall average basis, a per call basis, a per software thread basis, a per process basis, etc., or any combination thereof.

In one example, the anomalies are detected with regard to a library call type, a library call argument configuration and/or a library call timing associated with the runtime operation of the application, wherein the library call timing may include one or more of a delay attribute, a duration attribute, a temporal spacing attribute, and so forth. The logic architecture 54 may also include a security component 54c coupled to the anomaly detector, wherein the security component 54c triggers security events in response to the anomalies. Additionally, the collection of the control phase data may be repeated periodically or in response to certain conditions (e.g., detected anomalies) in order to achieve an adaptive learning functionality.

Figure 5:
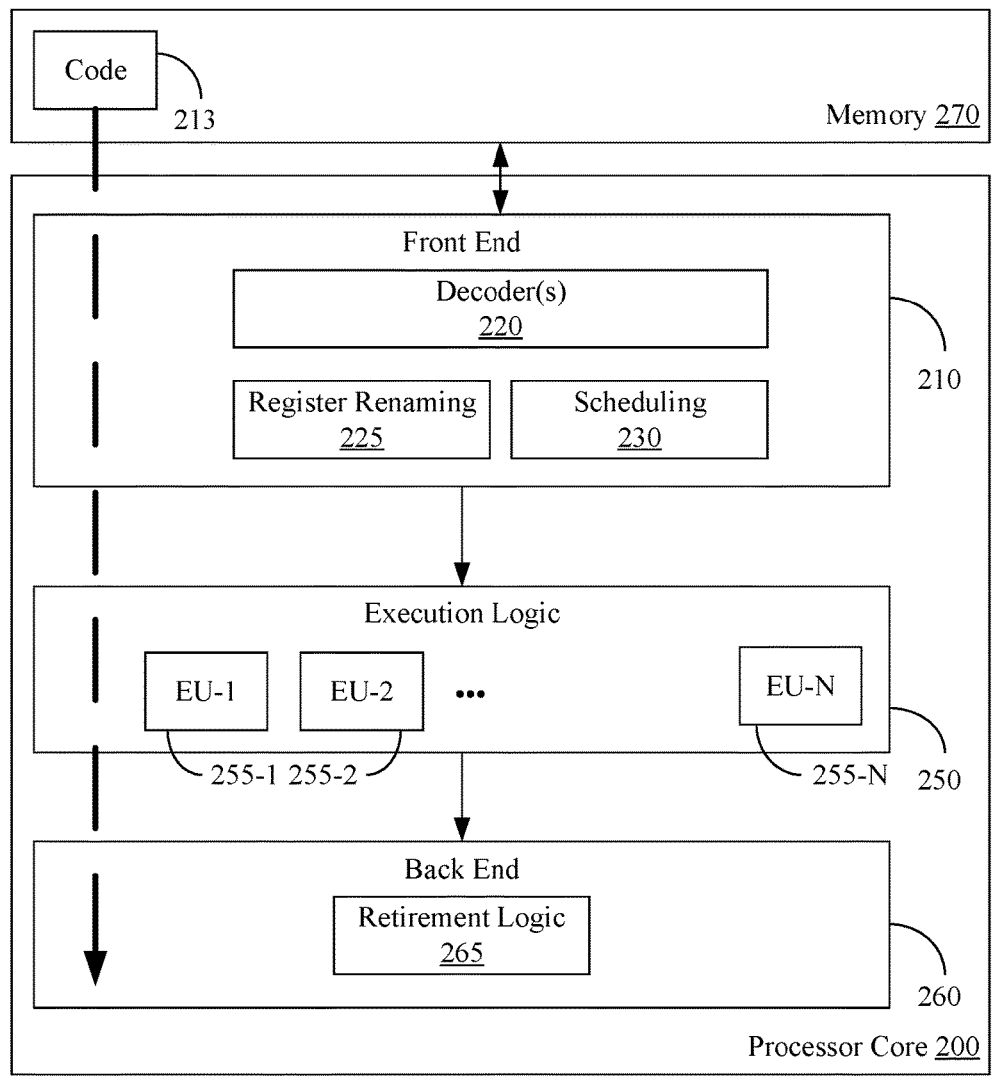
FIG. 5 is a block diagram of an example of a processor according to an embodiment.

FIG. 5 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 5, a processing element may alternatively include more than one of the processor core 200 illustrated in FIG. 5. The processor core 200 may be a single-threaded core or, for at least one embodiment, the processor core 200 may be multithreaded in that it may include more than one hardware thread context (or "logical processor") per core.

FIG. 5 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement the method 16 (FIG. 2) and/or the method 24 (FIG. 3), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 5, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Referring now to FIG. 6, shown is a block diagram of a system 1000 embodiment in accordance with an embodiment. Shown in FIG. 6 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 6 may be implemented as a multi-drop bus rather than point-to-point interconnect.

As shown in FIG. 6, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 5.

Each processing element 1070, 1080 may include at least one shared cache 1896a, 1896b (e.g., static random access memory/SRAM). The shared cache 1896a, 1896b may store data (e.g., objects, instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 6, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 6, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 6, various I/O devices 1014 (e.g., cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, network controllers/communication device(s) 1026 (which may in turn be in communication with a computer network), and a data storage unit 1019 such as a disk drive or other mass storage device which may include code 1030, in one embodiment. The code 1030 may include instructions for performing embodiments of one or more of the methods described above. Thus, the illustrated code 1030 may implement the method 16 (FIG. 2) and/or the method 24 (FIG. 3), already discussed, and may be similar to the code 213 (FIG. 5), already discussed. Additionally, the system 1000 may be duplicated as multiple computer nodes that form a high performance computing (HPC) cluster, as already discussed. Further, an audio I/O 1024 may be coupled to second bus 1020.

Note that other embodiments are contemplated. For example, instead of the point-to-point architecture of FIG. 6, a system may implement a multi-drop bus or another such communication topology. Also, the elements of FIG. 6 may alternatively be partitioned using more or fewer integrated chips than shown in FIG. 6.

Additional Notes and Examples:

Example 1 may include an apparatus to secure a computing environment comprising a pattern recognizer to identify a runtime behavioral pattern of an application, wherein the pattern recognizer includes a phase detector to identify one or more phases in the runtime behavioral pattern based on one or more of source markers, historical data or a search heuristic, an anomaly detector coupled to the pattern recognizer, the anomaly detector detects an anomaly in the runtime behavioral pattern, wherein the anomaly detector includes a control collector to obtain control phase data from the application, an anomaly collector to obtain current phase data from the application, and a comparator to compare the current phase data to the control phase data to detect the anomaly, wherein the anomaly is to be detected with regard to one or more of a library call count, a library call type, a library call argument configuration or a library call timing associated with a runtime operation of the application, and a security component coupled to the anomaly detector, the security component to trigger a security event in response to the anomaly.

Example 2 may include the apparatus of Example 1, wherein the library call timing is to include one or more of a delay attribute, a duration attribute or a temporal spacing attribute.

Example 3 may include the apparatus of Example 1, wherein the control phase data and the current phase data are to be obtained via function interposition.

Example 4 may include the apparatus of Example 1, wherein the current phase data is to be compared to the control phase data on one or more of an overall average basis, a per call basis, a per software thread basis or a per process basis.

Example 5 may include a method of securing a computing environment, comprising identifying a runtime behavioral pattern of an application, detecting an anomaly in the runtime behavioral pattern, and triggering a security event in response to the anomaly.

Example 6 may include the method of Example 5, wherein the anomaly is detected with regard to one or more of a library call count, a library call type, a library call argument configuration or a library call timing associated with a runtime operation of the application.

Example 7 may include the method of Example 6, wherein the library call timing includes one or more of a delay attribute, a duration attribute or a temporal spacing attribute.

Example 8 may include the method of Example 5, further including obtaining control phase data from the application; and obtaining current phase data from the application, wherein detecting the anomaly includes comparing the current phase data to the control phase data.

Example 9 may include the method of Example 8, wherein the control phase data and the current phase data are obtained via function interposition.

Example 10 may include the method of Example 8, wherein the current phase data is compared to the control phase data on one or more of an overall average basis, a per call basis, a per software thread basis or a per process basis.

Example 11 may include the method of any one of Examples 5 to 10, further including identifying one or more phases in the runtime behavioral pattern based on one or more of source markers, historical data or a search heuristic.

Example 12 may include at least one computer readable storage medium comprising a set of instructions which, when executed by a computing device, cause the computing device to identify a runtime behavioral pattern of an application, detect an anomaly in the runtime behavioral pattern, and trigger a security event in response to the anomaly.

Example 13 may include the at least one computer readable storage medium of Example 12, wherein the anomaly is to be detected with regard to one or more of a library call count, a library call type, a library call argument configuration or a library call timing associated with a runtime operation of the application.

Example 14 may include the at least one computer readable storage medium of Example 13, wherein the library call timing is to include one or more of a delay attribute, a duration attribute or a temporal spacing attribute.

Example 15 may include the at least one computer readable storage medium of Example 12, wherein the instructions, when executed, cause a computing device to obtain control phase data from the application; obtain current phase data from the application; and compare the current phase data to the control phase data to detect the anomaly.

Example 16 may include the at least one computer readable storage medium of Example 15, wherein the control phase data and the current phase data are to be obtained via function interposition.

Example 17 may include the at least one computer readable storage medium of Example 15, wherein the current phase data is to be compared to the control phase data on one or more of an overall average basis, a per call basis, a per software thread basis or a per process basis.

Example 18 may include the at least one computer readable storage medium of any one of Examples 12 to 17, wherein the instructions, when executed, cause a computing device to identify one or more phases in the runtime behavioral pattern based on one or more of source markers, historical data or a search heuristic.

Example 19 may include an apparatus to secure a computing environment, comprising a pattern recognizer to identify a runtime behavioral pattern of an application, an anomaly detector coupled to the pattern recognizer, the anomaly detector to detect an anomaly in the runtime behavioral pattern, and a security component coupled to the anomaly detector, the security component to trigger a security event in response to the anomaly.

Example 20 may include the apparatus of Example 19, wherein the anomaly is to be detected with regard to one or more of a library call count, a library call type, a library call argument configuration or a library call timing associated with a runtime operation of the application.

Example 21 may include the apparatus of Example 20, wherein the library call timing is to include one or more of a delay attribute, a duration attribute or a temporal spacing attribute.

Example 22 may include the apparatus of Example 19, wherein the anomaly detector includes a control collector to obtain control phase data from the application; an anomaly collector to obtain current phase data from the application; and a comparator to compare the current phase data to the control phase data to detect the anomaly.

Example 23 may include the apparatus of Example 22, wherein the control phase data and the current phase data are to be obtained via function interposition.

Example 24 may include the apparatus of Example 22, wherein the current phase data is to be compared to the control phase data on one or more of an overall average basis, a per call basis, a per software thread basis or a per process basis.

Example 25 may include the apparatus of any one of Examples 19 to 24, wherein the pattern recognizer includes a phase detector to identify one or more phases in the runtime behavioral pattern based on one or more of source markers, historical data or a search heuristic.

Example 26 may include n apparatus to secure a computing environment, comprising means for performing the method of any of Examples 5 to 11, in any combination or sub-combination.

Thus, techniques may provide a minimally intrusive solution to detecting abnormal behavior of applications during runtime. As a result, sensitive computing environments such as, for example, HPC environments handling nuclear device simulations, aerospace operations, banking and/or e-commerce transactions, and other security related tasks may achieve a greater level of intrusion protection beyond host-based intrusion detection system (HIDS) and/or network-based intrusion detection system (NIDS) levels of protection.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. At least one non-transitory computer readable storage medium comprising a set of instructions which, when executed by a computing device, cause the computing device to:
  interpose one or more functions in response to a control library call from an application to obtain control data from the application;
  identify a runtime behavioral pattern of the application based at least on the control data;
  interpose one or more functions in response to a current library call from the application to obtain current data from the application;
  detect an anomaly in the runtime behavioral pattern, wherein the current data is to be compared to the runtime behavioral pattern to detect the anomaly, and wherein the anomaly is to be indicative of an insertion of malicious code, and is to be detected with regard to one or more of a library call count, a library call type, a library call argument configuration or a library call timing associated with a runtime operation of the application; and
  trigger a security event in response to the anomaly.

2. The at least one non-transitory computer readable storage medium of claim 1, wherein the library call timing is to include one or more of a delay attribute, a duration attribute or a temporal spacing attribute.

3. The at least one non-transitory computer readable storage medium of claim 1, wherein the current data is to be compared to the control data on one or more of an overall average basis, a per call basis, a per software thread basis or a per process basis.

4. The at least one non-transitory computer readable storage medium of claim 1, wherein the instructions, when executed, cause a computing device to identify one or more phases in the runtime behavioral pattern.

5. The at least one non-transitory computer readable storage medium of claim 4, wherein the one or more phases are to be based on one or more of source markers, historical data or a search heuristic.

6. The at least one non-transitory computer readable storage medium of claim 1, wherein the anomaly is to be hidden from a user of the application.

7. The at least one non-transitory computer readable storage medium of claim 6, wherein the application is to be associated with one or more of an input/output (I/O) device, a user interface (IU), a camera, a microphone, a communication device, a network controller, a memory, or a sensor.

8. An apparatus comprising:
  an input/output (I/O) device;
  a network controller;
  a processor coupled to the I/O device and the network controller; and
  a memory coupled to the processor, the memory including a set of instructions, which when executed by the processor, cause the apparatus to:
  interpose one or more functions in response to a control library call from an application to obtain control data from the application,
  identify a runtime behavioral pattern of the application based at least on the control data;
  interpose one or more functions in response to a current library call from the application to obtain current data from the application,
  detect an anomaly in the runtime behavioral pattern, wherein the current data is to be compared to the runtime behavioral pattern to detect the anomaly, and wherein the anomaly is to be indicative of an insertion of malicious code, and is to be detected with regard to one or more of a library call count, a library call type, a library call argument configuration or a library call timing associated with a runtime operation of the application; and
  trigger a security event in response to the anomaly.

9. The apparatus of claim 8, wherein the library call timing is to include one or more of a delay attribute, a duration attribute or a temporal spacing attribute.

10. The apparatus of claim 8, wherein the current data is to be compared to the control data on one or more of an overall average basis, a per call basis, a per software thread basis or a per process basis.

11. The apparatus of claim 8, wherein the anomaly detector is to identify one or more phases in the runtime behavioral pattern.

12. The apparatus of claim 11, wherein the one or more phases are to be based on one or more of source markers, historical data or a search heuristic.

13. The apparatus of claim 8, wherein the anomaly is to be hidden from a user of the application.

14. The apparatus of claim 13, wherein the application is to be associated with one or more of the I/O device, a user interface (IU), a camera, a microphone, a communication device, the network controller, the memory, or a sensor.

15. A method comprising:
  interposing one or more functions in response to a control library call from an application to obtain control data from the application;
  identifying a runtime behavioral pattern of the application, wherein the runtime behavioral pattern is to be based at least on the control data;
  interposing one or more functions in response to a current library call from the application to obtain current data from the application;
  detecting an anomaly in the runtime behavioral pattern by comparing the current phase data to the runtime behavioral pattern, wherein the anomaly is indicative of an insertion of malicious code, and is detected with regard to one or more of a library call count, a library call type, a library call argument configuration or a library call timing associated with a runtime operation of the application; and
  triggering a security event in response to the anomaly.

16. The method of claim 15, wherein the library call timing includes one or more of a delay attribute, a duration attribute or a temporal spacing attribute.

17. The method of claim 15, wherein the current phase data is to be compared to the control phase data on one or more of an overall average basis, a per call basis, a per software thread basis or a per process basis.

18. The method of claim 15, further including identifying one or more phases in the runtime behavioral pattern.

19. The method of claim 18, wherein the one or more phases are to be based on one or more of source markers, historical data or a search heuristic.

20. The method of claim 15, wherein the anomaly is to be hidden from a user of the application.

21. The method of claim 20, wherein the application is to be associated with one or more of an input/output (I/O) device, a user interface (IU), a camera, a microphone, a communication device, a network controller, a memory, or a sensor.

22. An apparatus comprising:
  one or more data collectors to obtain control data and current data from the application, wherein the control data and current data are obtained by interposing one or more functions in response to a library call from the application;

a pattern recognizer, at least partially implemented in one or more of configurable logic hardware or fixed-functionality hardware logic, to identify a runtime behavioral pattern of an application based at least on the control data;

an anomaly detector, at least partially implemented in one or more of configurable logic hardware or fixed-functionality hardware logic, to detect an anomaly in the runtime behavioral pattern based on a comparison of the current data and the runtime behavioral pattern, wherein the anomaly is to be indicative of the insertion of malicious code, and is to be detected with regard to one or more of a library call count, a library call type, a library call argument configuration or a library call timing associated with a runtime operation of the application; and a security component, at least partially implemented in one or more of configurable logic hardware or fixed-functionality hardware logic, coupled to the anomaly detector, the security component to trigger a security event in response to the anomaly.

23. The apparatus of claim 22, wherein the library call timing is to include one or more of a delay attribute, a duration attribute or a temporal spacing attribute.

24. The apparatus of claim 22, wherein the current data is to be compared to the control data on one or more of an overall average basis, a per call basis, a per software thread basis or a per process basis.

25. The apparatus of claim 22, wherein the pattern recognizer includes a phase detector to identify one or more phases in the runtime behavioral pattern.

26. The apparatus of claim 25, wherein one or more phases are to be based on one or more of source markers, historical data or a search heuristic.

27. The apparatus of claim 22, wherein the anomaly is to be hidden from a user of the application.

28. The apparatus of claim 27, wherein the application is to be associated with one or more of an input/output (I/O) device, a user interface (IU), a camera, a microphone, a communication device, a network controller, a memory, or a sensor.

* * * * *